United States Patent
Morse

[15] 3,692,991
[45] Sept. 19, 1972

[54] FLASH UNIT WITH INDEXIBLE SOCKET

[72] Inventor: John B. Morse, Cambridge, Mass.

[73] Assignee: Polaroid Corporation, Cambridge, Mass.

[22] Filed: Dec. 24, 1970

[21] Appl. No.: 101,337

[52] U.S. Cl. ..................................240/1.3, 95/11 R
[51] Int. Cl. ..............................................G03b 15/03
[58] Field of Search..........240/1.3, 37, 37.1; 95/11 R

[56] References Cited

UNITED STATES PATENTS

| | | | |
|---|---|---|---|
| 3,491,666 | 1/1970 | Sauer et al. | 95/11 R |
| 3,494,268 | 2/1970 | Voigtlander | 95/11 R |
| 3,473,454 | 10/1969 | Stutz et al. | 240/37.1 X |
| 3,353,463 | 11/1967 | Horton et al. | 240/1.3 X |
| 3,353,467 | 11/1967 | Ernisse et al. | 240/1.3 X |
| 3,354,300 | 11/1967 | Parsons et al. | 240/1.3 |
| 3,369,468 | 2/1968 | Sapp, Jr. et al. | 240/1.3 X |
| 3,497,863 | 2/1970 | Horton et al. | 240/1.3 X |

FOREIGN PATENTS OR APPLICATIONS

| | | | |
|---|---|---|---|
| 1,490,898 | 6/1967 | France | 240/1.3 |

*Primary Examiner*—Louis R. Prince
*Assistant Examiner*—Joseph W. Roskos
*Attorney*—Brown & Mikulka, William D. Roberson and Michael Bard

[57] ABSTRACT

The subject invention provides a flash unit whose housing accommodates an indexible socket for releaseably receiving and retaining a Flashcube or the like. The socket is indexible within the housing to place the individual flash lamps into an optimum position for the illumination of a subject. The indexing mechanism is manually actuated and is so designed that an indication will be provided after the first fired flash lamp has been placed at its initial index position and means are provided for preventing further indexing of the Flashcube. Additionally, the flash unit is self-contained and incorporates its own power supply.

37 Claims, 5 Drawing Figures

FLASH UNIT WITH INDEXIBLE SOCKET

BACKGROUND OF THE INVENTION

Flash units for use with photographic cameras and employing Flashcubes are now well-known. By turning the Flashcube container through angles of 90°, the user can place successive flash lamps in an optimum position for making flash exposures. Typically, the Flashcube may be attached directly to the body of the camera and the latter accommodates all the electrical components of the flash unit, such as a battery and a capacitor, as well as a mechanism for indexing the Flashcube to a series of different angular positions.

It is also known to provide a flash unit, utilizing Flashcubes as the source of illumination, which is constructed and assembled in such a way that it may be readily utilized in conjunction with cameras which are not equipped with a built-in battery and which need not be provided with automatic or semi-automatic indexing means for changing the angular position of the Flashcubes.

The present invention, while seeking to provide a self-contained flash unit for attachment to a camera, provides a much-improved self-contained flash unit employing novel features heretofore unavailable.

Accordingly, it is an object of the present invention to provide a flash unit which is constructed and assembled in such a way that it is self-contained and may be readily utilized in conjunction with cameras which are not equipped with a built-in battery and which need not be provided with automatic or semi-automatic indexing means for changing the angular position of a Flashcube or the like.

Another object of the present invention is to provide a self-contained manually indexible flash unit attachment for a camera.

A further object of the subject invention is to provide a simple and efficient self-contained flash unit attachment for a camera, which unit is adapted to releaseably secure a Flashcube or the like such that the same may be manually indexed.

A still further object of the instant invention is to provide a self-contained flash unit attachment for a camera, having means for manually indexing a flash lamp array or the like and further including means for indicating to the user when the first used flash lamp has been placed in its initial firing position.

Yet a still further object of the present invention is to provide a novel flash unit attachment for a camera employing means for manually indexing a flash lamp array or the like and means for disabling said manual indexing means after the last unused flash lamp of said Flashcube has been suitably positioned and fired.

SUMMARY OF THE INVENTION

The subject invention provides a novel flash unit for attachment to a camera wherein the flash unit is self-contained, i.e., it contains its own power supply. The flash unit is provided with a housing which accommodates an indexible socket. Further, the novel flash unit includes a clutch assembly which is engaged when a Flashcube or the like is inserted into the socket and the entire socket and clutch assembly is rotated against a spring by means of an arm-driven pawl and ratchet assembly.

Movement of the arm and pawl through a predetermined arc will rotate the Flashcube a predetermined amount and the Flashcube will be urged into and held in a precisely predetermined position by virtue of an indexing spring. Each time the Flashcube is indexed, the arm and its associated pawl return to the initial position with the exception that when the first used flash lamp is brought into its initial firing position, the arm and pawl do not return, indicating to the user that all the flash lamps of the Flashcube have been fired. When the flashcube is withdrawn from the unit, the clutch is disengaged and the spring is allowed to unwind so that the arm may return to the initial position and the process may be repeated upon insertion of a new Flashcube into the socket, as aforesaid.

DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein.

DETAILED DESCRIPTION OF THE INVENTION

Figure 1:
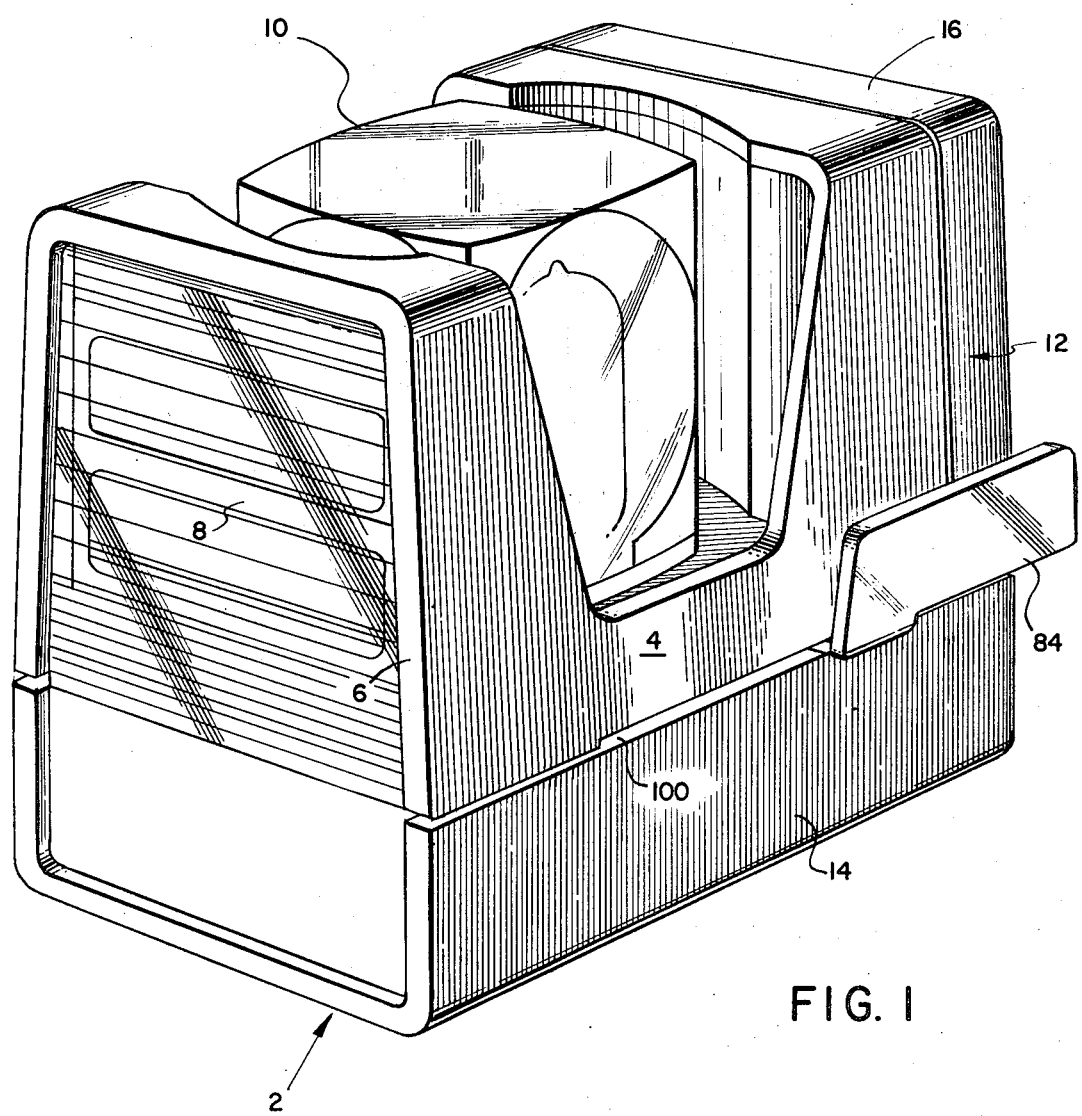
FIG. 1 provides a simplified perspective of the subject invention including a Flashcube releaseably secured therein.

Referring to the drawings in more detail and, more particularly to FIG. 1, the novel flash unit is shown generally at 2 and, apart from the novel indexing mechanism to be described infra, said flash unit 2 includes other novel features more fully described in connection with the embodiment of FIGS. 5–8 of copending U.S. Patent Application, Ser. No. 101,336, filed Dec. 24, 1970, and commonly assigned herewith (case 4159).

The flash unit 2 includes a housing shown generally at 4 which includes a forward portion 6, having a window 8, for the transmission of illumination from one of the lamps of a Flashcube 10, or other flash lamp array, to a selected subject. The Flashcube 10 is disposed generally centrally within the housing 4 so as to achieve a compact and pleasing design such as taught in more detail in copending U.S. Application Ser. No. 26,626, filed Dec. 24, 1970, and commonly assigned herewith (Case 4220).

The housing 4 further includes a rear portion 12 and a base portion 14. The rear portion 12 includes a removable cover assembly 16 which functions to conceal and provide access to a power supply for the Flashcube 10 such as a common battery power supply.

Figure 2:
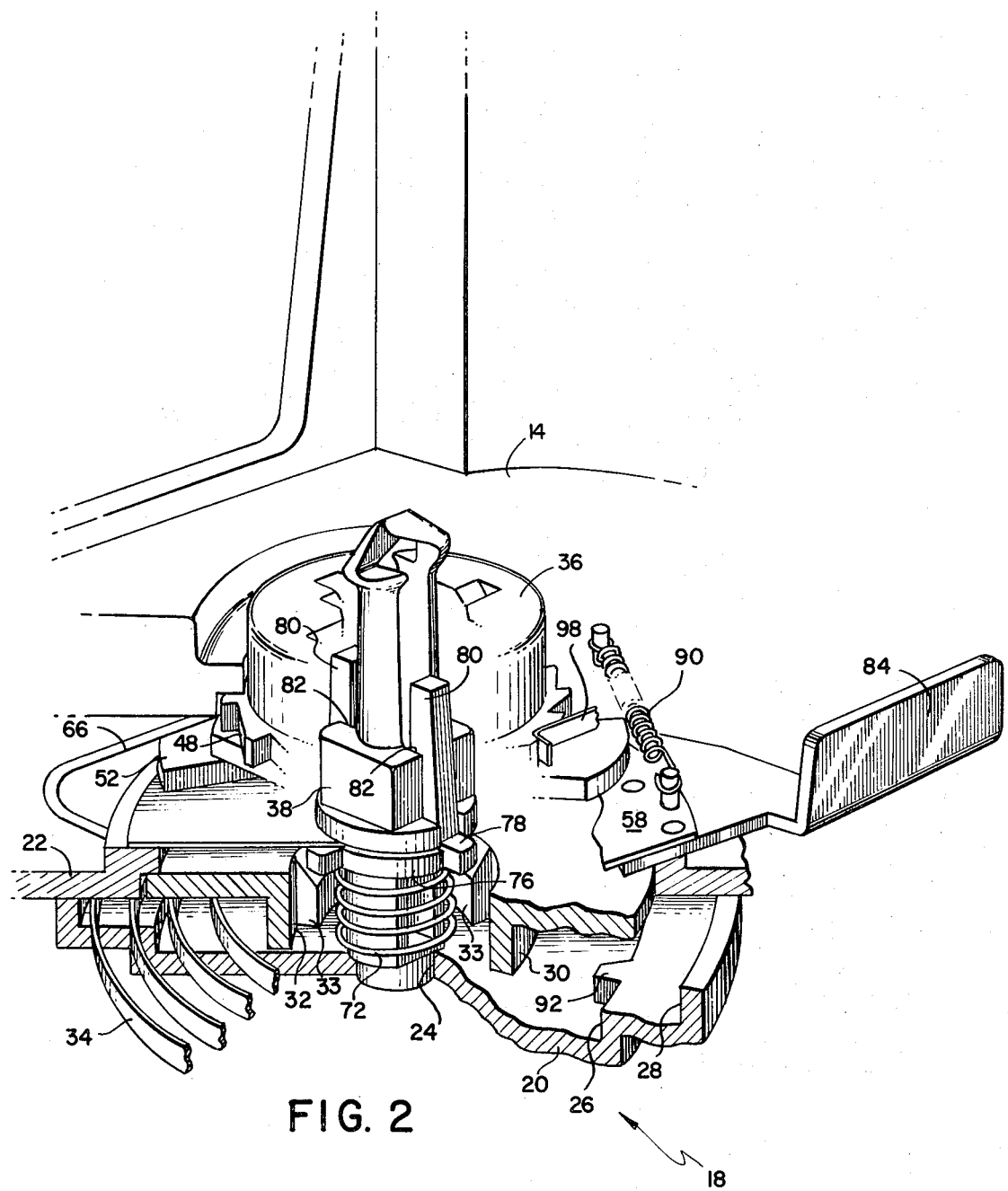
FIG. 2 provides a simplified perspective of a portion of the flash unit of FIG. 1 partly in section.
Figure 5:
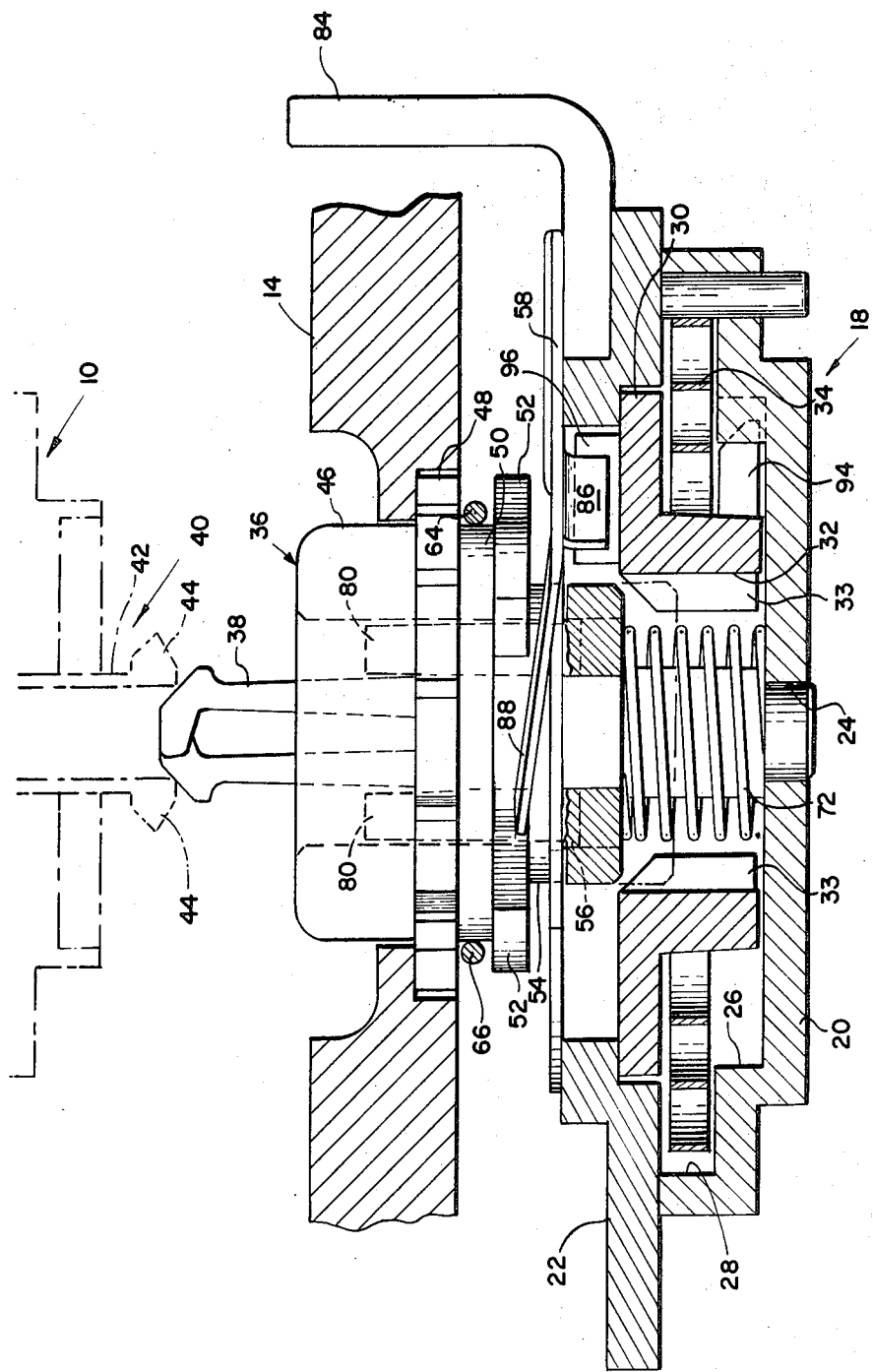
FIG. 5 provides a simplified cross-section of the flash unit of FIG. 1 with a portion of the Flashcube shown in phantom, upward of the flash unit.

As best seen in FIGS. 2 and 5, the novel Flashcube indexing mechanism is illustrated generally at 18, disposed within the base portion 14 of the flash unit 2. The Flashcube indexing mechanism 18 is provided with a generally cylindrical lower housing portion 20 and a mating cover housing portion 22. The lower housing portion 20 includes a cylindrical opening 24, which extends centrally and axially therethrough, and first and second cylindrical faces 26 and 28, respectively, which are concentric with each other and with the cylindrical opening 24.

A driven clutch member 30 is rotatably disposed between the lower housing portion 20 and the mating cover housing portion 22, coaxially therewith, and includes an opening centrally therethrough defining a cylindrical inner surface 32. The inner surface 32 is provided with equi-annularly spaced axially extending splines 33 which function in a manner described, infra.

A spring motor 34 is disposed between the lower housing portion 20 and the mating cover housing portion 22 coaxial therewith, and with one end of said spring motor 34 fixed to the cylindrical face 28 and the other end of said spring motor 34 fixed to the driven clutch member 30.

Figure 3:
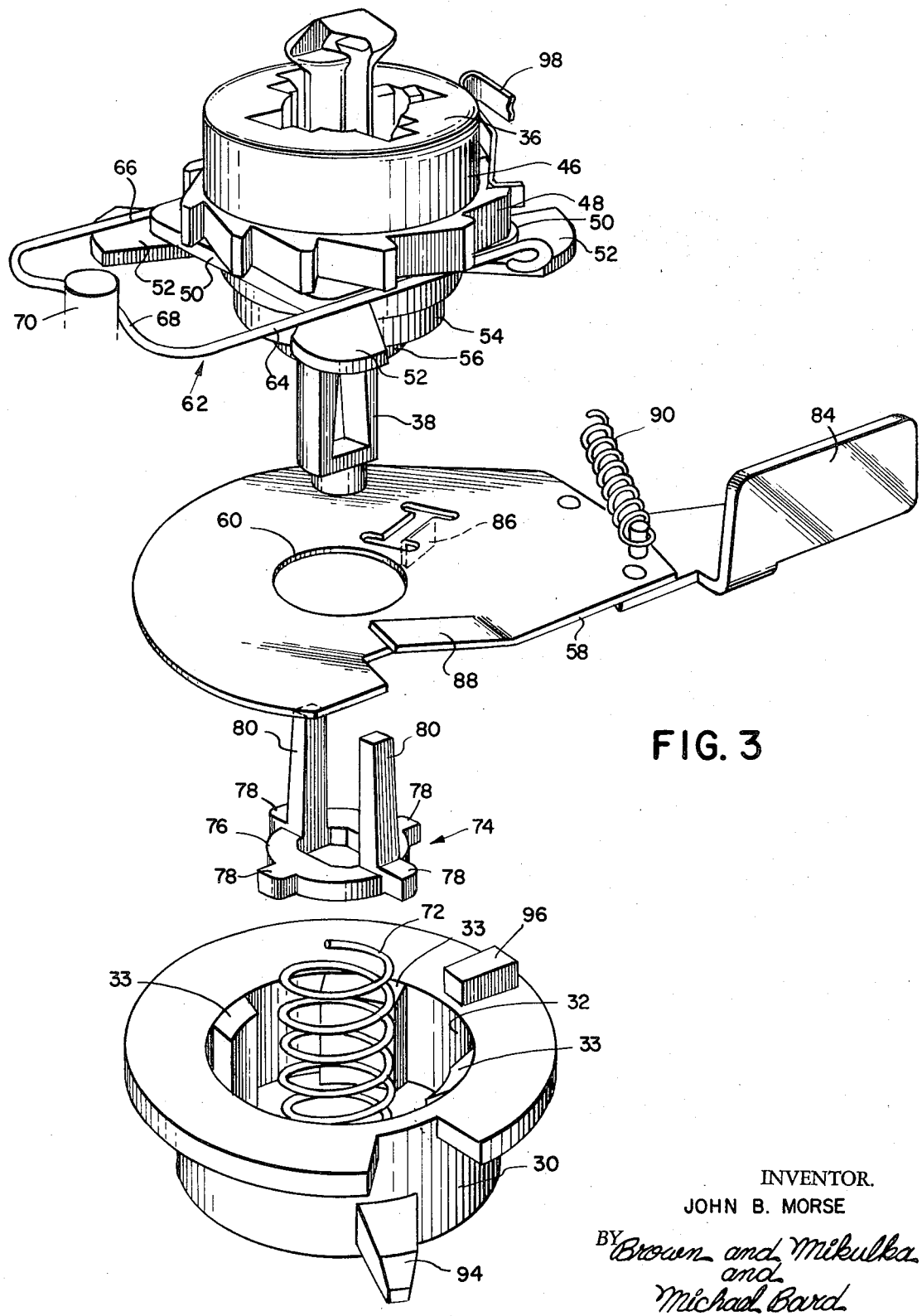
FIG. 3 provides an exploded perspective of a portion of the invention illustrated in FIG. 2.

As best seen in FIGS. 2, 3, and 5, the indexing mechanism 18 includes a socket assembly 36 and a retaining unit 38 extending axially therethrough. The socket assembly 36 and the retaining unit 38 are rotatably secured within the base portion 14 of the flash unit 2 coaxial with the housing portion 20.

As best seen in FIG. 5, the Flashcube 10 is provided with a plug assembly 40 having a depending spindle 42 and said spindle 42 is provided with a plurality of radially extending lugs 44. The socket assembly 36 is provided with an opening generally centrally therethrough of suitable shape to receive the depending spindle 42, of the plug assembly 40, and engage the lugs 44, whereby there will be no relative rotation between the socket assembly 36 and the Flashcube 10.

The periphery of the socket assembly 36 extends axially from an upper cylindrical portion 46 to a ratchet portion 48, next to a generally square-shape cam surface 50, next to a plurality of equi-annularly spaced, radially extending ears 52, forming a ratchet, next to a cylindrical portion 54 and, thence, to a cylindrical portion 56 of reduced diameter.

An arm 58 in the form of a plate having a cylindrical opening 60 therethrough is interposed between the socket assembly 36 and the cover housing portion 22, whereby the cylindrical portion 56 is received within the opening 60 such that the arm 58 is pivotally supported on the surface of the cylindrical portion 56. A U-shape indexing spring 62 is disposed within the base portion 14 above the cover housing portion 22 with its leg portions 64 and 66 engaging diametrically opposite faces of the square-shape cam surface 50. The closed end of the U-shape spring 62 is provided with an indented portion 68 which is adapted to engage a post 70 fixedly secured within the base portion 14, as to the cover housing portion 22, whereby the U-shape spring 62 will be prevented from rotating with the socket assembly 36 within said base portion 14.

A compression spring 72 is supported by the lower housing portion 20 and extends coaxially through the driven clutch member 30. A driving clutch member 74 is interposed between the arm 58 and the driven clutch member 30 coaxial with the lower housing portion 20 and is resiliently supported and upwardly urged by the compression spring 72.

The driving clutch member 74 comprises a generally cylindrical body portion 76 having a plurality of equi-annularly spaced lugs 78 extending radially outward therefrom and a pair of spaced legs 80 extending axially upward through the opening 60 and slideably engaging a pair of keyways 82 in opposite faces of the retaining unit 38 whereby said driving clutch member 74 may slideably move axially against the resilient force exerted thereon by the compression spring 72.

The arm 58 includes a handle portion 84, a depending tab portion 86, a cantilevered pawl portion 88, and is biased in a counterclockwise direction by means of a tension spring 90 secured at one end to said cover housing portion 22 and at its other end to a point on said arm 58 eccentric of the center of rotation thereof.

The lower housing portion 20 is provided with a lug 92 extending radially inward from the first cylindrical face 26 and adapted to engage a corresponding lug 94 extending radially outward of the periphery of the lower portion of the driven clutch member 30. 34 The upper face of the driven clutch member 30 is provided with a lug 96 which is adapted to engage the tab 86 of the arm 58 in a manner to be described in more detail, infra. A second pawl 98 is secured within the base portion 14 of the housing 4, as to cover housing portion 22, and engages the ratchet portion 48 of the socket assembly 36 so as to prevent counterclockwise rotation of said socket assembly 36.

As best seen in FIG. 1, the housing 4 is provided with a slot 100 whereby the handle portion 84 of the arm 58 may extend outward of the housing 4 so as to be readily accessible to the user. The slot 100 is of such length as to predetermine the arc of travel of the arm 58. Also, it should be noted that the spring motor 34 is preloaded to bias the driven clutch member 30 in a counterclockwise direction to bring the lug 94 into abutment with the lug 92 so as to establish an initial reference position for the lug 96 with respect to the tab 86.

Considering the operation of the novel indexing mechanism 18 in more detail and with particular reference to FIG. 5, it should be perceived that insertion of the Flashcube 10 into the unit 2 (as illustrated in FIG. 1) will cause the radially extending lugs 44, and the depending spindle 42, of the plug assembly 40 to engage the uppermost faces of the spaced legs 80 whereby the driving clutch member 74 will be driven downward against the compression spring 72 and the equi-annularly spaced lug portions 78 will slide between the splines 33 on the cylindrical inner surface 32 of the driven clutch member 30. The legs 80, however, will remain engaged with the retaining unit 38, via the keyways 82, thereby preventing relative rotation between the socket assembly 36 and, hence, the Flashcube 10 and the driving clutch member 74.

If the handle 84 is now advanced in a clockwise direction, the cantilevered pawl 88 will come into abutment with one of the radially extending ears 52 causing the socket assembly 36 to begin clockwise rotation against the resilient force exerted by the spring legs 64 and 66, of the U-shape indexing spring 62, as such legs 64 and 66 are driven apart by the square-shape cam surface 50. At this time, the U-shape spring 62 will be restrained from rotation with the socket assembly 36 by the post 70, in abutment with the indented portion 68 as mentioned hereinabove.

Continued clockwise advancement of the handle 84 and the arm 58 will cause continued clockwise advancement of the socket assembly 36 and, hence, the Flashcube 10, causing the clutch member 74, via the lugs 78 and the splines 33, to advance the driven clutch member 30 against the spring motor 34. It should be noted at this point that the ears 52 are spaced 90° apart and that the pawl 88 is so disposed that advancement of the arm 58 via the handle 84, an angular distance approximating 90°, will cause the socket assembly 36 and the Flashcube 10 to index 90° to the next quadrant, thereby presenting a new flash lamp at the window 8 of the flash unit 2.

The U-shape spring 62 functions to ensure that the socket assembly 36 and the Flashcube 10 advance neither more nor less than a full quadrant when the arm 58 is advanced past a predetermined point. More specifically, the resilient force exerted on the cam surface 50 by the spring legs 64 and 66 will provide a torque tending to advance the socket assembly 36 to the next quadrant after same has been indexed past a predetermined point such as, for example, 60°.

After the arm 58 has completed its first full clockwise advance, it will be returned to its initial position by the torque exerted thereon by the tension spring 90. The pawl 88 is designed to resiliently bend about its juncture with the arm 58 whereby it may clear the preceding ear 52 as said arm 58 returns to its initial position.

Each time the handle 84 and the arm 58 are completely advanced in a clockwise direction, the lug 96 will be indexed 90 degrees with the driven clutch member 30 and the socket assembly 36. The lug 96 is so positioned on the upper surface of the driven clutch member 30 that on completion of the third consecutive advance of the handle 84 and the arm 58, the lug 96 will engage the dependent tab 86. At this time, the fourth and last of the flash lamps of the Flashcube 10 will be presented to the window 8. After thy handle 84 is next advanced, it will be stopped from returning to its initial position by virtue of the abutment between the lug 96 and the tab 86. Thus, the user will have a visual indication that the last flash lamp has been reached and he will know that subsequent photoflash lamp illumination will require the insertion of a new Flashcube 10 into the socket assembly 36.

After the ignition of the last of the flash lamps of the Flashcube 10, the user will withdraw said Flashcube 10 from the flash unit 2 whereby the compression spring 72 will drive the clutch member 74 axially upward and without the driven clutch member 30 whereupon the spring motor 34 will drive the clutch member 30 in a counterclockwise direction until the lug 94 engages the lug 92. Counterclockwise rotation of the driven clutch member 30 will carry with it the lug 96 disengaging same from the tab 86 and permitting the handle 84 and arm 58 to return once again to their initial or starting position. At this time, a new Flashcube 10 may be inserted into the socket assembly 36 and the entire procedure repeated.

Figure 4:
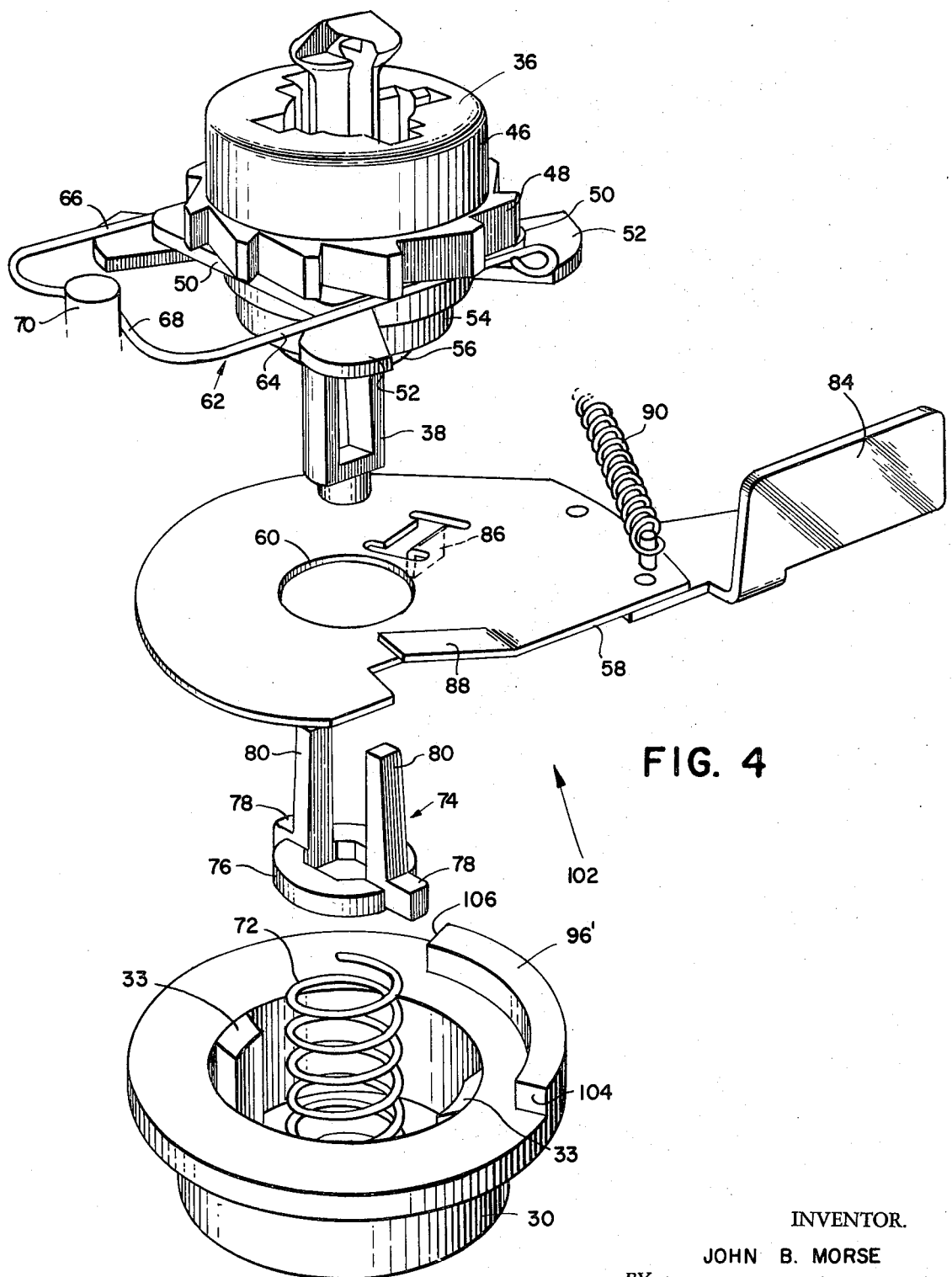
FIG. 4 provides an exploded perspective of an alternate embodiment of that portion of the invention illustrated in FIG. 3.

Referring to FIG. 4, an alternate embodiment of a portion of the invention illustrated in FIG. 3 is shown generally at 102. The embodiment of FIG. 4 is essentially similar to that of FIG. 3 with the exception that the lug 94 and, of course, its mating lug 92, FIG. 2, have been eliminated, as has the second pawl 98 and two of the equi-annularly spaced lug portions 78.

The lug 96, on the driven clutch member 30, has been replaced with an axially extending annular ridge 96' having planar end faces 104 and 106, respectively. The annular ridge 96' is so positioned on the upper surface of the driven clutch member 30, that prior to the insertion of a Flashcube 10 into the socket assembly 36, and with the handle 84 fully retracted by the tension spring 90, the end face 106 of the annular ridge 96' will abut the tab 86. The annular ridge 96' extends approximately 90 angular degrees and, hence, the end face 104 will initially be positioned 90° in advance of the tab 86 (in a manner analogous to the positioning of the lug 96 with respect to the tab 86 in the embodiment of FIG. 3).

With the invention configured in accordance with the embodiment of FIG. 4, the operation is analogous to that with the embodiment of FIG. 3. By way of example, insertion of the Flashcube 10 into the socket assembly 36 will cause the driving clutch member 74 to extend downward against the spring 72 until the equi-annularly spaced lugs 78 are received between the splines 33. Note should be taken that the spring motor 34 (FIG. 5) is pretensioned to bias the driven clutch member 30 counterclockwise, but, as mentioned supra, the face 106 is initially in abutment with the lug 86 so that the lugs 78 will fit loosely between the splines 33, allowing a predetermined amount of play therebetween.

When the handle 84 is advanced in a clockwise direction, the cantilevered pawl 88 will engage one of the radially extending ears 52, rotating the socket assembly 36 in a clockwise direction and causing the two lugs 78 to come into abutment with the diametrally opposed splines 33, thereby driving the driven clutch member 30 against the spring motor 34.

As the handle 84 continues in its advance, the resilient force exerted on the cam surface 50 by the spring legs 64 and 66, will initially provide a torque tending to oppose clockwise motion of the handle 84, but, after said handle 84 has passed a predetermined position, e.g., an advance of 60 angular degrees, the torque exerted by the spring legs 64 and 66 will tend to oppose that exerted by the spring motor 94 and propel the socket assembly 96 and the Flashcube 10 into the next index position. Thereafter, the handle 84 may be released and the tension spring 90 will return said handle 84 to its initial position in abutment with the housing 4.

After the handle 84 is returned to its initial position, the spring motor 34 will tend to drive the driven clutch member 30 counterclockwise and, hence exert a counterclockwise torque on the socket assembly 36, via the driving clutch member 74. The counterclockwise torque exerted on the socket assembly 36 will be opposed by a clockwise torque exerted on said socket assembly 36 by the U-shape indexing spring 62, via the cam surface 50. By suitably pretensioning the U-shape spring 62, a sufficient holding force will be provided to maintain the position of the socket assembly 36 and, hence, the Flashcube 10, against the counterclockwise torque generated by the spring motor 34.

After the handle 84 has been successively advanced a total of three times, the face 106 will have been advanced a total of approximately 270°. Inasmuch as the face 104 leads the face 106 by approximately 90°, said face 104 will now be in abutment with the tab 86. Thereafter, the next successive advance of the handle 84 will cause the face 104 to advance therewith so that upon release of the handle 84, he tension spring 90 will exert a counterclockwise torque on the arm 58 which, in turn, will transmit same through the driven clutch member 30, via the face 104 of the annular ridge 96'. The spring motor 34 will now be fully wound and it, too, will exert a counterclockwise torque on the driven clutch member 30 which, in turn, will exert the combined counterclockwise torques onto the socket assembly 36 via the driving clutch member 74.

The U-shape indexing spring 62 must be pretensioned an amount sufficient to overcome the maximum counterclockwise torque exerted by the tension spring 90 and the spring motor 34 and, when so pretensioned, obviates the necessity of the second pawl 98 and the ratchet portion 48. In the embodiment of FIG. 4, however, the ratchet portion 48 has not been removed for ease of illustration. Indeed, it may be found expedient in the manufacturing process to provide the socket assembly 36 with such a ratchet portion 48 so that such socket assembly 36 might be used in conjunction with the embodiments illustrated in either FIG. 3 or FIG. 4

Inasmuch as the second pawl 98 is no longer present in the embodiment of FIG. 4, it is clear that even with the Flashcube 10 remaining inserted in the socket assembly 36, the handle 84 may be manually returned to its initial position in abutment with the housing 4 to provide for ease of storage, etc. As with the embodiment of FIG. 3, removal of the Flashcube 10 from the socket assembly 36 will cause the spring 72 to urge the driving clutch member 74 upward so as to disengage the lugs 78 from the splines 33, thereby permitting the spring motor 34 to return the driven clutch member 30 so its initial position with the face 106 of the ridge 96' in engagement with the tab 86 of the arm 58.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims, the instant invention may be practised in a manner otherwise than is specifically described herein.

What is claimed is:

1. A flash unit for use with a photographic camera, including:
   means for releasably receiving and securing a multi-flash lamp array;
   means for manually indexing said receiving means for moving said array between successive positions; and
   means for automatically returning said manual indexing means to a predetermined initial position upon removal of said multi-flash lamp array from said receiving means.

2. The invention as set out in claim 1, wherein said returning means includes a rotatable first clutch member and a second clutch member connected to said manual indexing means so as to index therewith and adapted to engage said first clutch member upon insertion of said array into said receiving means.

3. The invention of claim 2, wherein said flash unit includes a housing and said manual indexing means includes an arm extending outward of said housing and biased toward said initial position.

4. The invention as described in claim 3, wherein said flash unit includes means for releasably securing said arm at a position remote from said initial position when said array has been indexed a predetermined amount.

5. The invention according to claim 4, wherein said automatic returning means includes spring means interposed between said first and second clutch members and biased to oppose engagement of said clutch members.

6. Means for indexing a multi-flash lamp array so as to successively position the lamps thereof for the illumination of subject, including:
   a housing;
   means connected to said housing for releaseably receiving and securing said array;
   means for establishing a reference position;
   means, initially engaging said reference position establishing means and said receiving means, for effecting and summing the successive positioning of said array; and
   means for automatically positioning said effecting and summing means at said reference position upon release of said array.

7. The invention as set forth in claim 6, wherein said automatic positioning means includes a spring motor adapted to be wound by said effecting and summing means upon successive positioning of said lamps.

8. The invention as set out in claim 7, wherein said effecting and summing means includes a spring-loaded clutch adapted to engage said array and to be actuated thereby upon insertion of said array into said receiving means.

9. The invention according to claim 8, wherein said effecting and summing means includes an arm or the like operatively connected to said clutch whereby said arm will retain a predetermined position indicative of a predetermined number of successive positionings of said array.

10. The invention as delineated in claim 9, further including means, operatively connected to said effecting and summing means, for releaseably securing said receiving means at each of said successive index positions and cooperable with said effecting and summing means for urging said array into said successive index positions.

11. A flash unit for use with photographic cameras, including:
    housing means having a window;
    means disposed within said housing for releaseably receiving and securing a multi-flash lamp array;
    means for manually indexing said flash lamp array to position successive lamps of said array adjacent said window; and
    means connected to said manual indexing means for summing the successive positionings of said array.

12. The invention according to claim 11, further including means for establishing an initial reference position for said receiving and securing means with respect to said housing.

13. The invention as set forth in claim 12, wherein said manual indexing means includes an arm or the like, said receiving and securing means is indexible with said array with respect to said reference position, and said summing means includes means movable with said receiving and securing means and adapted to engage said arm and releaseably retain same at a predetermined position extending outward of said housing when said array has been successively indexed a predetermined number of times.

14. A flash unit for use with photographic cameras, including:
   housing means having a window;
   means disposed within said housing for releaseably receiving and securing a multi-flash lamp array;
   means, including an arm initially positioned adjacent one side of said housing, for manually indexing said array to position successive lamps thereof adjacent said window; and
   means indexible with said array and adapted to engage said arm after a predetermined number of successive indexings of said array and releaseably retain said arm at a position extending outward of said side of said housing.

15. A flash unit for use with photographic cameras, including:
   housing means having a window;
   socket means in said housing for receiving a rotatable multi-flash lamp array;
   a retaining unit for releasably securing a portion of said array within said socket means;
   means for manually indexing said array and socket means to position successive lamps of said array adjacent said window;
   a first clutch member rotatably disposed within said housing;
   a second clutch member for engaging said first clutch member in slideable engagement with said retaining unit and extending partially within said socket means an amount sufficient to engage at least a portion of said array; said first and second clutch members being configured to prevent relative rotation therebetween upon mutual engagement; and
   means for engaging and disengaging said first and second clutch members upon insertion and removal, respectively, of said array with respect to said socket means.

16. The invention as stated in claim 15, further including means for indicating indexing of said array a predetermined amount.

17. The invention as set out in claim 16, further including means for automatically advancing said socket means to a predetermined index position and securing same thereat upon advancement of said socket means by said manual indexing means a predetermined amount.

18. The invention as set out in claim 17, additionally including means for establishing a reference for the rotational position of said socket means with respect to said housing means.

19. The invention as delineated in claim 18, wherein said automatic advancing means includes an indexing spring disposed within said housing means and a cam surface secured to said socket means and in engagement with said indexing spring.

20. The invention according to claim 19, wherein said flash unit includes means for returning said first clutch member to a predetermined reference position upon disengagement of said second clutch member therefrom.

21. The invention as recited in claim 20, wherein said clutch engaging and disengaging means includes a compression spring disposed within said housing beneath clutch member and about said retaining unit.

22. The invention according to claim 21, wherein said first clutch member returning means includes a spring motor; a projection extending from said first clutch member; an arm pivotally secured partially within said housing and adapted to abut said housing; and a tab extending from said arm and adapted to engage said projection whereby said spring motor may drive said first clutch member causing said arm to come into abutment with said housing.

23. The invention as related in claim 21, wherein said first clutch member returning means includes a spring motor, a first lug secured to said housing, and a second lug secured to said first clutch member and adapted to engage said first lug.

24. The invention as described in claim 22, further including means for allowing said socket to index in one direction while preventing such indexing in the opposite direction.

25. The invention of clam 24, wherein said manually indexing means includes an arm disposed partially within said housing and pivotable about an axis coincident with the axis of rotation of said socket means.

26. The invention as related in claim 25, further including means for biasing said arm in a direction opposite to that in which said socket means is indexed.

27. The invention according to claim 25, wherein said socket means includes ratchet means secured thereto and said arm is connected to a pawl adapted to engage said ratchet means and index said socket means upon advancement of said arm in a predetermined direction 28. The invention as stated in claim 27, wherein said pawl is cantilevered to said arm and is is adapted to bend outward of said ratchet means and slide past same upon advancement of said arm in a direction opposite to said predetermined direction.

29. The invention as set out in claim 28, wherein said indexing spring is adapted to exert a restraining torque upon said socket means sufficient to overcome any torque exerted on said socket means by said spring motor and said arm biasing means.

30. The invention as set forth in claim 29, wherein said arm biasing means include a tension spring connected between said arm and said housing.

31. The invention according to claim 30, wherein said arm biasing means is adapted to return said arm to an initial position absent an external driving force applied to said arm.

32. The invention as related in claim 31, wherein said tab depends from said arm and is adapted to engage said log or the like extending outward of said first clutch member.

33. The invention as delineated in claim 32, wherein said tab is so positioned on said arm and said outward extending lug or the like is so placed on said first clutch member that indexing said socket means a predetermined number of times will cause said outward extending lug or the like to engage said tab and prevnt said arm from returning to said initial position.

34. The invention as stated in claim 33, wherein said first clutch member includes a cylindrical opening centrally therethrough having a plurality of annularly spaced axially extending splines about the periphery thereof and said second clutch member includes a generally circular portion having a plurality of radially extending ears adapted to be received between and engage said splines.

35. The invention as delineated in claim 16, wherein said means for indicating indexing of said array a predetermined amount includes a lug or the like extending outward of said first clutch member and a tab extending from said manual indexing means and adapted to engage said outward extending lug, or the like.

36. The invention as set forth in claim 35, wherein said lug or the like comprises an annularly extending projection having two end faces, one of which initially engages said tab and the other of which engages said tab after first clutch member has indexed a predetermined amount.

37. The invention as et forth in claim 36, wherein said lug or the like extends annularly approximately 90°.

* * * * *